No. 691,499. Patented Jan. 21, 1902.
R. SNEDDEN.
MACHINE FOR CUTTING CONFECTIONERIES.
(Application filed Sept. 26, 1901.)
(No Model.)
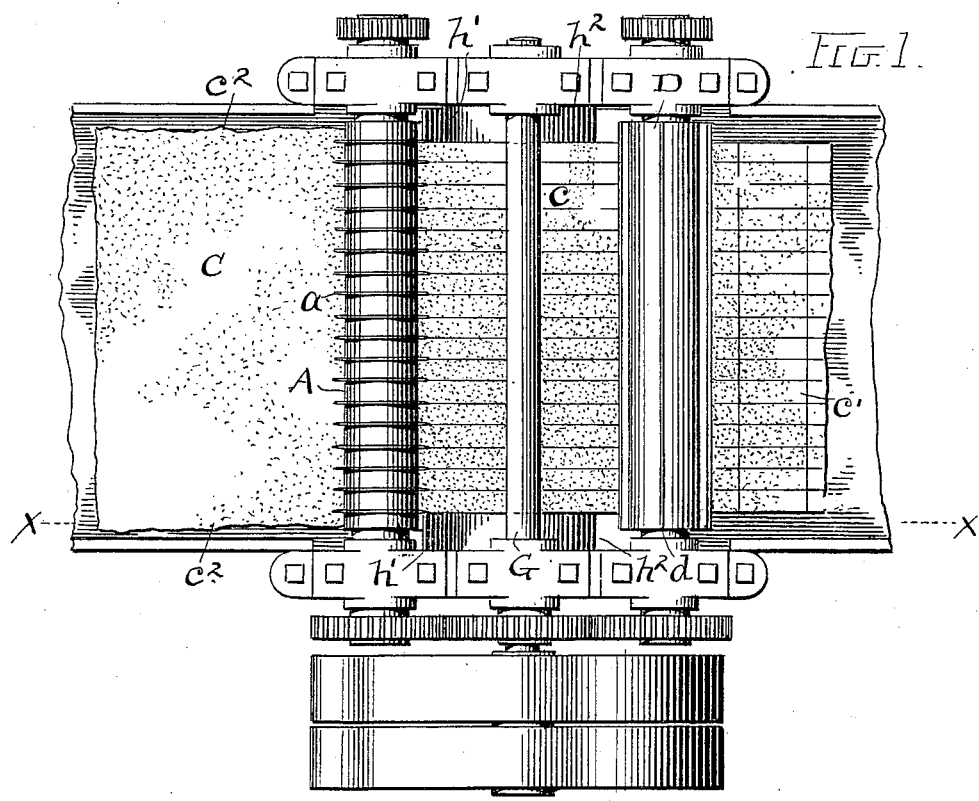
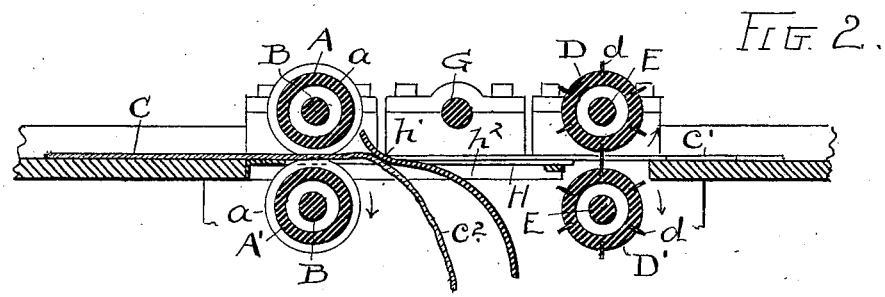
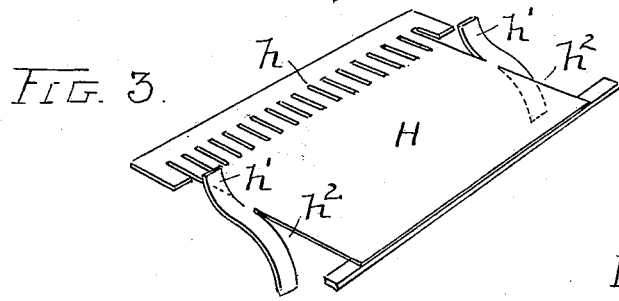
ATTEST
R. B. Moser
D. M. Fisher
INVENTOR
Richard Snedden
By H. V. Fisher, ATTY

UNITED STATES PATENT OFFICE.

RICHARD SNEDDEN, OF CLEVELAND, OHIO.

MACHINE FOR CUTTING CONFECTIONERIES.

SPECIFICATION forming part of Letters Patent No. 691,499, dated January 21, 1902.

Application filed September 26, 1901. Serial No. 76,642. (No model.)

*To all whom it may concern:*

Be it known that I, RICHARD SNEDDEN, a citizen of the United States, residing at Cleveland, in the county of Cuyahoga and State of Ohio, have invented certain new and useful Improvements in Machines for Cutting Confectioneries; and I do declare that the following is a full, clear, and exact description of the invention, which will enable others skilled in the art to which it appertains to make and use the same.

My invention relates to a machine for slicing confectioneries, and especially chewing-gum; and the object of the invention is to provide mechanism for taking care of the more or less irregular or ragged edges of a sheet of gum or other confection which has been rolled down to the requisite thickness for cutting into marketable shape and size. When thus rolled, any confection is liable to develop irregularly at both its edges, and hence when the sheet is subdivided, say, into so-called "sticks" of gum or other material in a flat form these edges must be separately disposed of and saved to go back into the unrolled stock to be worked over with it.

Hitherto in the use of machines having the general functions of the one here shown, in which the sheet of confection is carried forward under cutters adapted, first, to slice the sheet into suitable widths, and then through other cutters to divide the slices transversely into suitable lengths, it has been the practice to take care of the cast-off edges of the material at both sides by hand. This has entailed much labor and expense and has not been satisfactory, for the further reason that owing to the sticky nature of the material, especially at certain times or with certain kinds or grades of material, the drawing away of the edges was also liable to draw away some of the adjacent slices, so that they too would become waste and have to go back and be worked over. This materially reduced the real productiveness of the machines, besides entailing considerable expense. By my invention I effectually dispose of the said edges mechanically and without dragging along any of the adjacent slices or sticks and accomplish much better work without any additional expense whatever on this account.

In the accompanying drawings, Figure 1 is a plan view of a slicing and cutting machine containing my improvement. Fig. 2 is a longitudinal sectional elevation of the machine substantially on line $x\ x$, Fig. 1. Fig. 3 is a pespective view of the plate which lies under the slicing-cutters at its slotted edge and has certain novel features at its own edges, as hereinafter fully described.

The machine thus shown and described comprises two slicing-rolls A and A', one arranged directly over the other and provided each with a series of disk-shaped cutters $a$, suitably spaced apart on their shafts B, and having said cutters set to roll together at their edges. The sheet of gum or other confection C requires no other or additional feed than these cutters or disks, and their action is sufficient also to move the sheet forward through transverse cutting or severing rolls D and D'. These rolls are provided about their peripheries with longitudinally-arranged cutters or blades $d$ at suitable intervals, according to the length the slices $c$ are to be cut, for an example of which see pieces or sticks $c'$. Suitable gear or other power connections are made with the shafts B and E, through middle shaft G in this instance.

H represents a plate interposed between the two sets of rolls A A' and D D' and has slots $h$, through which the edges of the disks $a$ reach each other from the opposite sides. Heretofore this plate has been full width between the sides of the frame from edge to edge both ways; but in my improved construction I have sheared or cut nearly away the two side edges relatively, as shown in Fig. 3, to provide a deflector or guide $h'$ at each edge to take care of the irregular edge $c^2$ of the sheet C, as hereinbefore described. The said deflectors are cut on a line with the first cutter blades or disks $a$ at each side of the machine, so as to extend inward to the inner edge of the strip $c^2$, and said deflectors are turned upward at an inclination at their top about as shown to intercept the edge strips $c^2$ of the gum and direct them downward beneath the machine, where receptacles may be provided to receive them. The opposite or lower ends of said deflectors are curved downward. This also forms or provides an opening $h^2$ in the edges of the plate from which the deflectors are taken, which allows the edge strips $c^2$ of the gum, which may possibly crowd over the tops of said deflectors, a place to drop down into the space or receptacle beneath. Such provision for a drop is necessary, because with some sticky materials the said edges $c^2$ are often caught up with the traveling strips $c$ and dragged over or around the deflectors. In case the said deflectors are not cut directly from the edges of plate H, they may be separately provided and shaped as the work may require.

What I claim is—

1. In a confection-slicing machine, a set of revolving cutters to slice the confection lengthwise and a set of revolving cutters to cut the slices transversely, in combination with a plate between said rolls having slots for the first set of slicing-cutters and downward deflectors formed on the edges of said plate to carry down the outside side slices of the confection, said deflectors having one end turned upward from said plate and the other downward, substantially as described.

2. In a machine for slicing sheets of confections into strips, a set of revolving cutters to divide the sheet in strips lengthwise, in combination with a plate having slots $h$ entered by said cutters and deflectors $h'$ cut from the edges of said plate and having their ends bent in opposite directions and adapted to carry the edge strips of the confection downward, said plate having its front portion extending laterally as far as said deflectors, whereby an opening is formed in front of each deflector behind said front portion to enable the strips to pass down, substantially as described.

Witness my hand to the foregoing specification this 12th day of August, 1901.

RICHARD SNEDDEN.

Witnesses:
R. B. MOSER,
H. T. FISHER.